(12) United States Patent
Angvall et al.

(10) Patent No.: US 9,119,487 B2
(45) Date of Patent: Sep. 1, 2015

(54) DISPLAY SYSTEM

(71) Applicant: Target Brands, Inc., Minneapolis, MN (US)

(72) Inventors: Nicholas P. Angvall, Minneapolis, MN (US); Scott E. Denby, Minneapolis, MN (US); Joseph R. Stukenberg, Minneapolis, MN (US); Jeremy A. Clark, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 161 days.

(21) Appl. No.: 14/026,540

(22) Filed: Sep. 13, 2013

(65) Prior Publication Data

US 2015/0076312 A1    Mar. 19, 2015

(51) Int. Cl.
| | |
|---|---|
| *A47B 47/00* | (2006.01) |
| *A47F 5/00* | (2006.01) |
| *A47F 5/10* | (2006.01) |
| *F16M 11/04* | (2006.01) |
| *G09F 7/20* | (2006.01) |
| *G09F 7/18* | (2006.01) |

(52) U.S. Cl.
CPC .............. *A47F 5/0081* (2013.01); *A47F 5/103* (2013.01); *F16M 11/046* (2013.01); *G09F 7/18* (2013.01); *G09F 7/20* (2013.01); *G09F 2007/1834* (2013.01); *G09F 2007/1843* (2013.01)

(58) Field of Classification Search
USPC .......... 248/157, 188; 211/175, 204, 206, 207, 211/208, 189, 190, 191; 40/606.01, 606.03, 40/606.19, 610, 611.06, 611.05, 607.09, 40/607.04
See application file for complete search history.

(56) References Cited

U.S. PATENT DOCUMENTS

| | | |
|---|---|---|
| 1,219,596 A | 3/1917 | Simmons |
| D59,241 S | 10/1921 | Lion |
| 1,414,656 A | 5/1922 | Diaz |
| 1,541,200 A | 4/1925 | Thomson |
| D72,148 S | 3/1927 | Gill |
| D78,366 S | 4/1929 | Shepard |
| 1,804,770 A | 1/1930 | Hershfield |
| 1,835,098 A | 12/1931 | Shedd |
| 1,837,348 A | 12/1931 | Ware |
| 1,857,423 A | 5/1932 | Zadek |
| 1,934,533 A | 11/1933 | Hallowell et al. |

(Continued)

OTHER PUBLICATIONS

Three-dimensional Analysis and Reconstruction of Paintings, <http://www.eng.ox.ac.uk/NVorld/Research/Frontpage/2000-04/story.html& g- t;, Apr. 2000.

(Continued)

*Primary Examiner* — Steven Marsh
(74) *Attorney, Agent, or Firm* — Leanne Taveggia Farrell; Westman, Champlin & Koehler, P.A.

(57) ABSTRACT

A display fixture has a convertible rack fixture and an extendable frame assembly. The convertible rack fixture has a base with a top surface, two uprights extending from the top surface, two bottom crossbars extending between the two uprights, and two top crossbars extending between tops of the two uprights. The extendable frame assembly is located between the two bottom crossbars and between the two top crossbars and has a base frame and a telescoping frame that telescopes out of the base frame. The base frame has two substantially vertical legs that rest on the top surface of the base of the convertible rack and a lateral support that extends between the two substantially vertical legs separate from the top surface of the base.

20 Claims, 11 Drawing Sheets

(56) References Cited

U.S. PATENT DOCUMENTS

| | | |
|---|---|---|
| D99,034 S | 3/1936 | Le Fevre |
| 2,240,024 A | 4/1941 | Stone et al. |
| 2,436,273 A | 2/1948 | Solomon |
| 2,648,151 A | 8/1953 | Kindred |
| 2,710,241 A | 6/1955 | Lieberman |
| 2,737,742 A | 3/1956 | Leigh |
| 2,791,851 A | 5/1957 | Richter |
| 2,798,618 A | 7/1957 | Singer |
| 2,824,395 A | 2/1958 | Decker et al. |
| 2,865,124 A | 12/1958 | Mortellito |
| 2,893,568 A | 7/1959 | Scholz |
| 2,896,789 A | 7/1959 | Sans et al. |
| 2,919,034 A | 12/1959 | Levy |
| 2,923,417 A | 2/1960 | Sonksen |
| 2,932,771 A | 4/1960 | Craven, Jr. |
| 2,987,195 A | 6/1961 | Smith |
| 2,991,140 A | 7/1961 | Anderson et al. |
| 3,081,718 A | 3/1963 | Shoffner |
| 3,087,186 A | 4/1963 | Budd |
| 3,092,257 A | 6/1963 | Rountree |
| D199,471 S | 10/1964 | Leibow |
| 3,186,363 A | 6/1965 | Moore |
| 3,209,709 A | 10/1965 | Shoffner |
| 3,219,300 A | 11/1965 | Gunderson |
| 3,229,824 A | 1/1966 | De'Caccia |
| 3,272,345 A | 9/1966 | Wallace |
| 3,297,374 A | 1/1967 | Radek |
| 3,326,505 A | 6/1967 | Jamar, Jr. |
| 3,329,282 A | 7/1967 | Swan et al. |
| D211,838 S | 7/1968 | Gelles |
| 3,402,906 A | 9/1968 | Wellman |
| 3,411,634 A | 11/1968 | Pesce |
| 3,415,519 A | 12/1968 | Hand |
| 3,519,235 A | 7/1970 | Walter |
| 3,529,798 A | 9/1970 | Williams et al. |
| 3,601,256 A | 8/1971 | Bowers |
| 3,626,870 A | 12/1971 | Schild |
| 3,630,742 A | 12/1971 | Crawford |
| 3,640,389 A | 2/1972 | Snyder |
| 3,667,826 A | 6/1972 | Wood et al. |
| 3,722,122 A | 3/1973 | Sesto |
| 3,737,048 A | 6/1973 | Giroux |
| D228,539 S | 10/1973 | Gelles |
| 3,766,675 A | 10/1973 | Leigh |
| 3,792,917 A | 2/1974 | Martinez |
| 3,830,374 A | 8/1974 | Kassimir |
| 3,856,320 A | 12/1974 | Blanchard |
| 3,865,250 A | 2/1975 | Jay |
| 3,969,837 A | 7/1976 | Kresse |
| 4,034,496 A | 7/1977 | Cohen |
| 4,035,941 A | 7/1977 | Deffner |
| 4,046,083 A | 9/1977 | Murdoch et al. |
| 4,123,862 A | 11/1978 | Dyer et al. |
| 4,127,196 A | 11/1978 | Boucher |
| 4,138,083 A | 2/1979 | Spiegel |
| 4,161,831 A | 7/1979 | Restle |
| 4,186,666 A | 2/1980 | Honickman |
| 4,191,298 A | 3/1980 | Broudy |
| 4,214,392 A | 7/1980 | Virsen |
| 4,242,970 A | 1/1981 | Suttles et al. |
| 4,244,411 A | 1/1981 | Karlstrom et al. |
| 4,253,578 A | 3/1981 | Rekow |
| D263,358 S | 3/1982 | Winter et al. |
| 4,324,076 A | 4/1982 | Honickman |
| 4,331,245 A | 5/1982 | Schell |
| 4,336,886 A | 6/1982 | Azoulay et al. |
| 4,344,367 A | 8/1982 | Merl |
| 4,380,298 A | 4/1983 | Harig |
| 4,431,156 A | 2/1984 | Mena |
| 4,444,322 A | 4/1984 | Lee |
| 4,452,416 A | 6/1984 | Templeton |
| 4,460,097 A | 7/1984 | Darnell, II et al. |
| 4,473,963 A | 10/1984 | Hardy et al. |
| D277,626 S | 2/1985 | Evans |
| 4,508,231 A | 4/1985 | Honickman |
| 4,530,863 A | 7/1985 | Seeger |
| 4,536,423 A | 8/1985 | Travis |
| D283,148 S | 3/1986 | Coyne |
| 4,577,767 A | 3/1986 | Geschwender |
| 4,584,218 A | 4/1986 | Travis |
| 4,596,195 A | 6/1986 | Wenger |
| 4,611,866 A | 9/1986 | Everett |
| 4,633,607 A | 1/1987 | Brasch et al. |
| 4,633,788 A | 1/1987 | Robertson |
| 4,645,165 A | 2/1987 | Raap |
| 4,655,354 A | 4/1987 | Cohen |
| D290,791 S | 7/1987 | Kester |
| D291,036 S | 7/1987 | Scarpa et al. |
| 4,693,381 A | 9/1987 | Lodge |
| 4,716,841 A | 1/1988 | Suttles |
| 4,717,110 A | 1/1988 | Fohrman |
| D294,543 S | 3/1988 | Rekow |
| 4,736,996 A | 4/1988 | Zeichner |
| 4,762,235 A | 8/1988 | Howard et al. |
| D300,289 S | 3/1989 | Walter |
| 4,821,893 A | 4/1989 | Wyatt |
| D301,413 S | 6/1989 | Rosen |
| D307,606 S | 5/1990 | Jervis, Sr. |
| D308,229 S | 5/1990 | Jervis, Sr. |
| 4,925,038 A | 5/1990 | Gajewski |
| D308,398 S | 6/1990 | Sartz |
| 4,932,539 A | 6/1990 | Abinanti |
| 4,932,540 A | 6/1990 | Pfeifer |
| 4,948,154 A | 8/1990 | Guggenheim |
| 4,954,384 A | 9/1990 | Hartwell |
| 4,976,360 A | 12/1990 | Zucker et al. |
| D314,090 S | 1/1991 | Stephens et al. |
| D314,286 S | 2/1991 | Glassenberg |
| D314,530 S | 2/1991 | Eyal |
| 4,993,680 A | 2/1991 | Gemmen et al. |
| D316,571 S | 4/1991 | Romero-Comas et al. |
| 5,014,862 A | 5/1991 | Bustos |
| D318,194 S | 7/1991 | Terrell et al. |
| D319,934 S | 9/1991 | Terrell et al. |
| D321,997 S | 12/1991 | Inman |
| D322,188 S | 12/1991 | Leis et al. |
| 5,103,579 A | 4/1992 | Mayers |
| D326,965 S | 6/1992 | Allen |
| 5,124,858 A | 6/1992 | Goetz |
| D327,788 S | 7/1992 | Allen |
| D328,825 S | 8/1992 | Allen |
| D328,830 S | 8/1992 | Allen |
| 5,141,105 A | 8/1992 | Maye |
| D331,160 S | 11/1992 | Brunner |
| D331,331 S | 12/1992 | Brunner |
| D335,052 S | 4/1993 | Barbuto et al. |
| D335,592 S | 5/1993 | Barthelmess et al. |
| 5,248,047 A | 9/1993 | Randhawa |
| 5,265,363 A | 11/1993 | Martin |
| 5,272,991 A | 12/1993 | Carrigan, Jr. |
| 5,332,108 A | 7/1994 | Blass |
| 5,367,807 A | 11/1994 | Van Beek |
| 5,372,262 A | 12/1994 | Benson et al. |
| 5,417,431 A | 5/1995 | Gluck |
| 5,433,046 A | 7/1995 | MacQuarrie et al. |
| 5,474,185 A | 12/1995 | Franke |
| 5,495,568 A | 2/1996 | Beavin |
| D371,026 S | 6/1996 | Hendler et al. |
| 5,529,192 A | 6/1996 | Conen et al. |
| 5,530,652 A | 6/1996 | Croyle et al. |
| 5,535,898 A | 7/1996 | Burgess, Sr. et al. |
| 5,542,758 A | 8/1996 | Brown |
| 5,544,765 A | 8/1996 | Farbman |
| 5,555,640 A | 9/1996 | Ou |
| 5,564,579 A | 10/1996 | Pynenburg et al. |
| 5,566,844 A | 10/1996 | Bernardin |
| 5,573,150 A | 11/1996 | Trujillo |
| 5,588,376 A | 12/1996 | Seidl et al. |
| 5,606,816 A | 3/1997 | Schwartz |
| 5,607,070 A | 3/1997 | Hellyer |
| 5,611,442 A | 3/1997 | Howard |
| 5,653,349 A | 8/1997 | Dana et al. |
| 5,660,637 A | 8/1997 | Dodge |
| 5,695,346 A | 12/1997 | Sekiguchi et al. |

(56) References Cited

U.S. PATENT DOCUMENTS

| | | |
|---|---|---|
| 5,745,666 A | 4/1998 | Gilley et al. |
| D394,360 S | 5/1998 | Geier et al. |
| 5,848,498 A | 12/1998 | Szabo, Sr. et al. |
| 5,850,222 A | 12/1998 | Cone |
| 5,887,878 A | 3/1999 | Tisbo et al. |
| D409,858 S | 5/1999 | Reed |
| 5,915,656 A | 6/1999 | Grewe |
| 5,918,750 A | 7/1999 | Jackson |
| 5,921,190 A | 7/1999 | Wood |
| 5,944,203 A | 8/1999 | Vlah et al. |
| 5,947,307 A | 9/1999 | Battaglia et al. |
| D414,815 S | 10/1999 | McDonald |
| 5,971,343 A | 10/1999 | Marlak |
| D417,978 S | 12/1999 | Reed |
| 6,029,833 A | 2/2000 | Yeh |
| 6,038,797 A | 3/2000 | Smith |
| 6,053,115 A | 4/2000 | Felton |
| D426,999 S | 6/2000 | Smith |
| D427,457 S | 7/2000 | Heiny et al. |
| 6,089,387 A | 7/2000 | Varfolomeeva |
| 6,105,793 A | 8/2000 | Riga |
| D434,081 S | 11/2000 | Gruber |
| 6,144,388 A | 11/2000 | Bornstein |
| 6,164,467 A | 12/2000 | DePottey et al. |
| 6,182,795 B1 | 2/2001 | Boerer |
| 6,213,434 B1 | 4/2001 | Reichanadter, Jr. |
| 6,216,888 B1 | 4/2001 | Chien |
| 6,298,591 B1 | 10/2001 | Healy |
| 6,299,001 B1 | 10/2001 | Frolov et al. |
| 6,310,627 B1 | 10/2001 | Sakaguchi |
| D450,473 S | 11/2001 | Walter |
| D450,486 S | 11/2001 | Stafford et al. |
| D450,948 S | 11/2001 | Stafford et al. |
| D451,300 S | 12/2001 | Stafford et al. |
| 6,338,215 B1 | 1/2002 | Vincent |
| 6,347,714 B1 | 2/2002 | Fournier et al. |
| D455,295 S | 4/2002 | Miller |
| 6,364,137 B1 | 4/2002 | Glauth et al. |
| 6,379,765 B1 | 4/2002 | Woods |
| D457,919 S | 5/2002 | Whittier et al. |
| D459,106 S | 6/2002 | Walter |
| 6,404,426 B1 | 6/2002 | Weaver |
| 6,405,880 B1 | 6/2002 | Webb |
| 6,412,647 B1 | 7/2002 | Ko |
| 6,418,879 B1 | 7/2002 | Reiman |
| 6,427,855 B2 | 8/2002 | LaBruna, Jr. et al. |
| 6,427,857 B1 | 8/2002 | Adams et al. |
| 6,431,374 B1 | 8/2002 | Winikoff |
| D462,999 S | 9/2002 | Evans et al. |
| D466,331 S | 12/2002 | Chang |
| 6,488,160 B2 | 12/2002 | Wang |
| 6,503,188 B1 | 1/2003 | August |
| D470,685 S | 2/2003 | Chang |
| 6,515,025 B2 | 2/2003 | Hanson et al. |
| D473,073 S | 4/2003 | Kettering et al. |
| 6,546,309 B1 | 4/2003 | Gazzuolo |
| 6,553,699 B2 | 4/2003 | Edmunds et al. |
| D474,350 S | 5/2003 | Sardis |
| 6,561,365 B2 | 5/2003 | Bustos |
| 6,561,366 B2 | 5/2003 | Kim-So |
| D478,123 S | 8/2003 | Marshall |
| 6,644,484 B1 | 11/2003 | Sardis |
| 6,654,046 B2 | 11/2003 | Eccleshall |
| 6,669,037 B1 | 12/2003 | Ahn |
| 6,688,940 B2 | 2/2004 | Stanier |
| D495,523 S | 9/2004 | Harwanko |
| 6,786,340 B2 | 9/2004 | Ford et al. |
| 6,820,853 B1 | 11/2004 | DuBarry |
| 6,880,708 B2 | 4/2005 | Boron |
| 6,916,436 B2 | 7/2005 | Tarabula |
| 6,935,523 B2 | 8/2005 | Ahn |
| 6,959,824 B1 | 11/2005 | Alperson |
| 7,100,780 B1 | 9/2006 | VanCalbergh et al. |
| D530,940 S | 10/2006 | Raile |
| 7,118,000 B2 | 10/2006 | Shea |
| 7,118,001 B2 | 10/2006 | Klein et al. |
| D533,738 S | 12/2006 | Berg et al. |
| 7,149,665 B2 | 12/2006 | Feld et al. |
| 7,194,327 B2 | 3/2007 | Lam |
| 7,212,202 B2 | 5/2007 | Weaver |
| D544,730 S | 6/2007 | Stukenberg |
| 7,228,977 B2 | 6/2007 | Perkins et al. |
| 7,261,214 B2 | 8/2007 | Wagner et al. |
| D554,919 S | 11/2007 | Clark et al. |
| 7,296,372 B2 | 11/2007 | Clark et al. |
| D571,130 S | 6/2008 | Clark et al. |
| D571,131 S | 6/2008 | Clark et al. |
| D602,713 S | 10/2009 | Stukenberg |
| 7,644,527 B2 | 1/2010 | Clark et al. |
| 7,661,214 B2 | 2/2010 | Clark et al. |
| 7,810,658 B2 | 10/2010 | Clark et al. |
| 7,900,385 B2 | 3/2011 | Clark et al. |
| 7,926,214 B2 | 4/2011 | Conway et al. |
| 7,946,435 B2 | 5/2011 | Clark et al. |
| 7,988,000 B2 | 8/2011 | Clark et al. |
| 8,191,720 B2 | 6/2012 | Clark et al. |
| 8,708,169 B1 * | 4/2014 | Chen .................. 211/189 |
| 2002/0004763 A1 | 1/2002 | Lam |
| 2002/0038941 A1 | 4/2002 | Erickson |
| 2002/0099560 A1 | 7/2002 | Enfield |
| 2002/0100198 A1 | 8/2002 | Stone et al. |
| 2003/0110099 A1 | 6/2003 | Trajkovic et al. |
| 2004/0105718 A1 | 6/2004 | Talarick et al. |
| 2004/0148833 A1 | 8/2004 | Virvo |
| 2004/0173550 A1 | 9/2004 | Adams |
| 2005/0000924 A1 | 1/2005 | Webb |
| 2005/0127018 A1 | 6/2005 | Sung |
| 2005/0230338 A1 | 10/2005 | Farinola et al. |
| 2005/0236544 A1 | 10/2005 | Mancino et al. |
| 2006/0070276 A1 | 4/2006 | Clark et al. |
| 2007/0170139 A1 | 7/2007 | Clark et al. |
| 2008/0078728 A1 | 4/2008 | Hodge |
| 2008/0087621 A1 | 4/2008 | Zang et al. |
| 2008/0172917 A1 | 7/2008 | Brandow et al. |
| 2009/0250422 A1 * | 10/2009 | Clark et al. .................. 211/189 |
| 2010/0199537 A1 * | 8/2010 | Ernetoft .................... 40/607.04 |
| 2014/0259831 A1 * | 9/2014 | Denby et al. ............... 40/606.03 |

OTHER PUBLICATIONS

Chang, Holograms Go Futuristic, <http://www.findarticles.com/cf_dls/m1590/9_55/55183062/print.jhtml>, Feb. 1999.

3D Property Visualization, <http://www.notcon-internet.co.uk/3d_visualisations.htm>.

Hajewski, "Country Store doing well-Reiman builds successful retail business through catalog sales," <http://www.jsonline.com/bym/news/apr01/hajecol18041701a.asp>, Apr. 2001.

Lifesize Celebrity Cardboard Cutouts, <http://www.cardboardcutouts.com/>, Feb. 2004.

Male Flat Mannequin, http://www.thefixturezone.com/malflatman2.html.

Holography 101, <http://www.litholographics.com/technology.htm>.

Full-Color Holograms, with up to Five Seconds of Actual Motion, <http://www.litholographics.com/products/products.htm>.

Flat Mannequins Forms and Display Hangers, <http://www.valuefixtures.ab.ca/bend/flat_mannequins_forms_pg2.htm>.

eLifesize, The No. 1 Choice for Lifesize Standups Online!, <http://www.elifesize.com/>.

Development of a 3D Cad System for the Garment Industry, <http://www.cadcam.ust.hk/research/garment/3d-cad/>.

The Benefits and Value of New Generation Holography, <http://www.litholographics.com/applications/applications.htm>.

Lozier Store Fixtures Catalog, Jan. 1981, Straight Display Rack No. ASP6ASSP, p. 1107, Jan. 1981.

Vitrashop Euroshop Catalog, upper display rack, 1987.

Office Action from Canadian Patent Application No. 2,831,239, mailed Jan. 8, 2014 (2 pages).

* cited by examiner

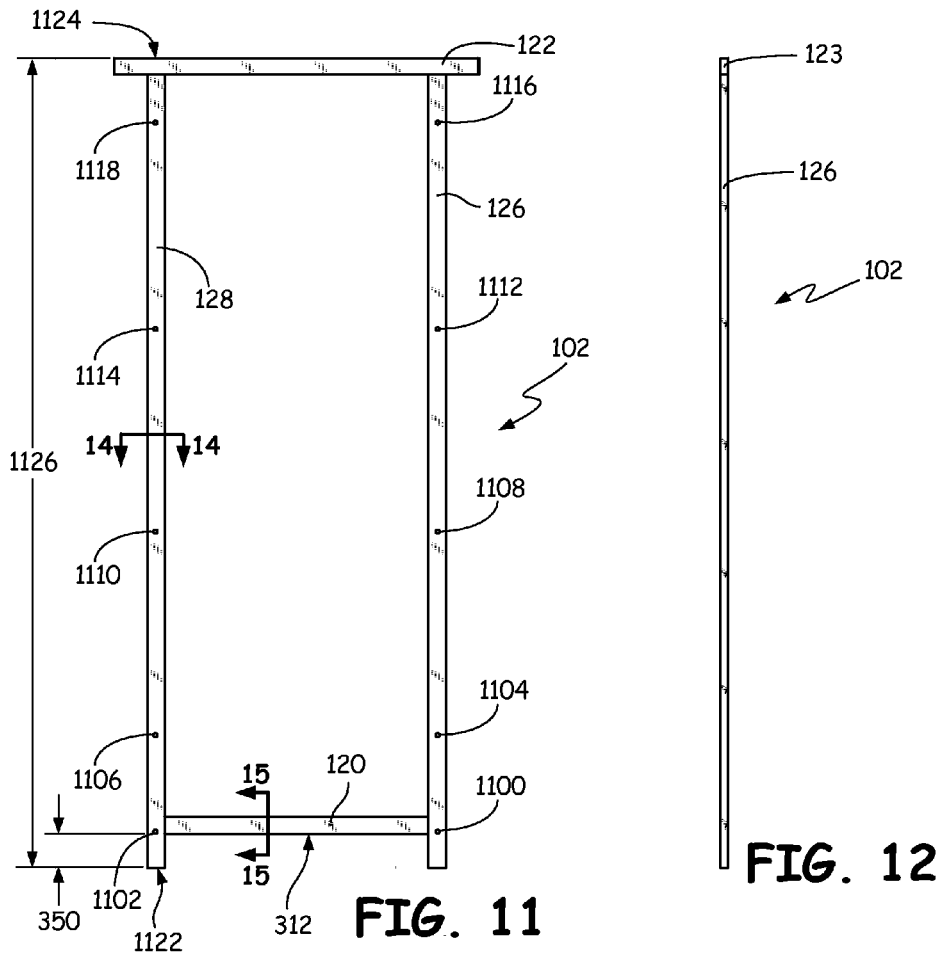
FIG. 11
FIG. 12
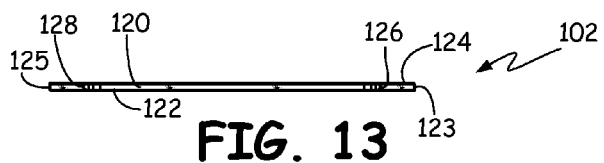
FIG. 13

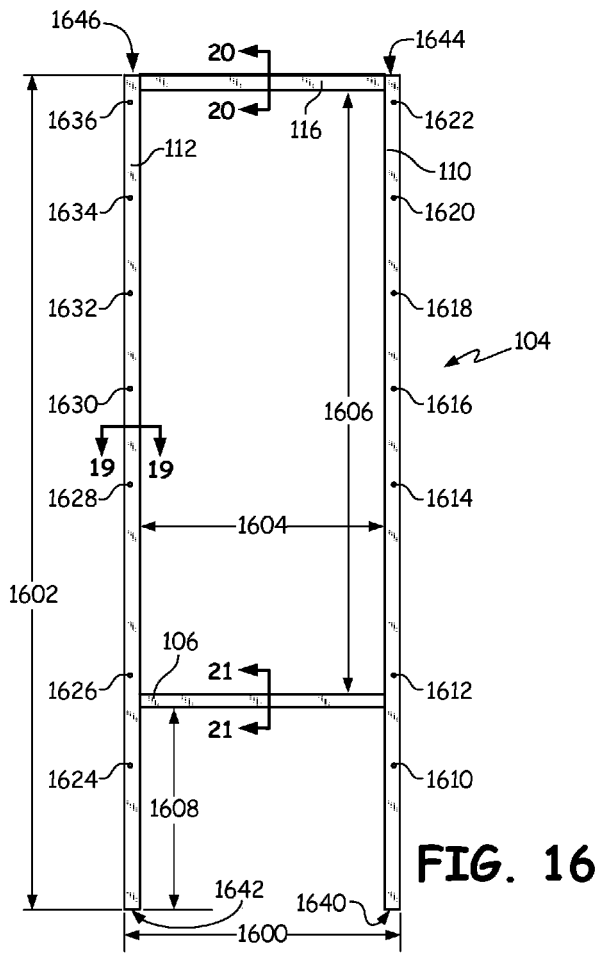
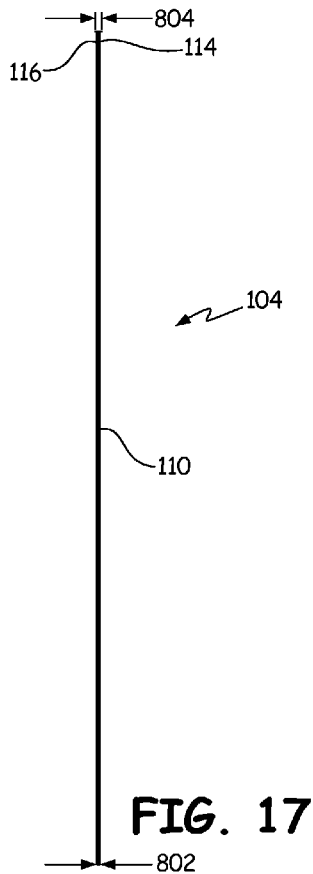
FIG. 16
FIG. 17
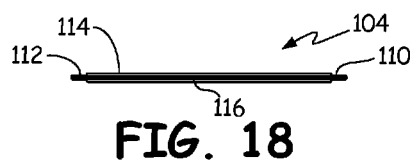
FIG. 18

DISPLAY SYSTEM

BACKGROUND

Display fixtures are often used to support and display merchandise in a retail environment. A class of displays known as quad racks or convertible racks are designed to be moved to different locations within a store and display merchandise such that customers are able to walk around the rack while looking at the merchandise. In addition, quad racks and convertible racks typically include telescoping members that can be moved upward to support merchandise on multiple levels on the rack. Such racks are often used to support hanging items such as clothing supported on individual hangers. Quad racks and convertible racks can also display merchandise at a single level if desired.

The discussion above is merely provided for general background information and is not intended to be used as an aid in determining the scope of the claimed subject matter. The claimed subject matter is not limited to implementations that solve any or all disadvantages noted in the background.

SUMMARY

A display fixture has a convertible rack fixture and an extendable frame assembly. The convertible rack fixture has a base with a top surface, two uprights extending from the top surface, two bottom crossbars extending between the two uprights, and two top crossbars extending between tops of the two uprights. The extendable frame assembly is located between the two bottom crossbars and between the two top crossbars and has a base frame and a telescoping frame that telescopes out of the base frame. The base frame has two substantially vertical legs that rest on the top surface of the base of the convertible rack and a lateral support that extends between the two substantially vertical legs separate from the top surface of the base.

A billboard extender has a lower frame and an extendable frame. The lower frame has two substantially vertical supports. The extendable frame has two movable supports that move within the two substantially vertical supports and a top lateral support extending between tops of the two movable supports. The top lateral support has a first lateral member having a substantially vertical portion, a substantially horizontal portion and a bend between the substantially vertical portion and the substantially horizontal portion, and a second lateral member spaced apart from the first lateral member and having a substantially vertical portion, a substantially horizontal portion and a bend between the substantially vertical portion and the substantially horizontal portion.

A display unit has a base fixture and an extendable billboard support. The base fixture has a platform, two substantially vertical members extending upward from the platform, two top lateral supports extending between the two substantially vertical members at a top of the two substantially vertical members, and two lower lateral supports extending between the two substantially vertical members between the platform and the two top lateral supports. The extendable billboard support is located between the two lower lateral supports and between the two top lateral supports and has an outer frame and an inner frame. The outer frame has two substantially vertical elements and two fixed stops positioned in the two substantially vertical elements and the inner frame has two substantially vertical elements that slide within the two substantially vertical elements of the outer frame such that when bottoms of the substantially vertical elements of the inner frame are in contact with the fixed stops, a lower crossbar between the substantially vertical elements of the inner frame is located above the two lower lateral supports and below the two top lateral supports.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 11 is a front view of an outer frame.

FIG. 12 is a right side view of an outer frame.

FIG. 13 is a top view of an outer frame.

FIG. 16 is a front view of an inner frame.

FIG. 17 is a right side view of an inner frame.

FIG. 18 is a top view of an inner frame.

DETAILED DESCRIPTION

Embodiments described below provide an extendable frame assembly or a billboard extender that can be positioned within a rack fixture and can be telescoped upward to support signs used to draw attention to the merchandise supported by the rack fixture. The extendable frame assembly is designed with an inner frame that may telescope from an outer frame. The inner frame includes a top lateral support that extends between two substantially vertical members. The top lateral support includes two members where each member is constructed of a bent rigid material having a substantially vertical portion and a substantially horizontal portion. The bent members provide structural support to the inner frame and prevent the inner frame from being inserted into the outer frame upside down. The extendable frame assembly includes several lateral supports with one of the lateral supports hidden between crossbars of the rack fixture and the other lateral supports positioned above crossbars on the rack fixture to avoid pinching a person's hand when the extendable frame assembly is inserted into the rack fixture or when the extendable frame is being collapsed.

Figure 1:
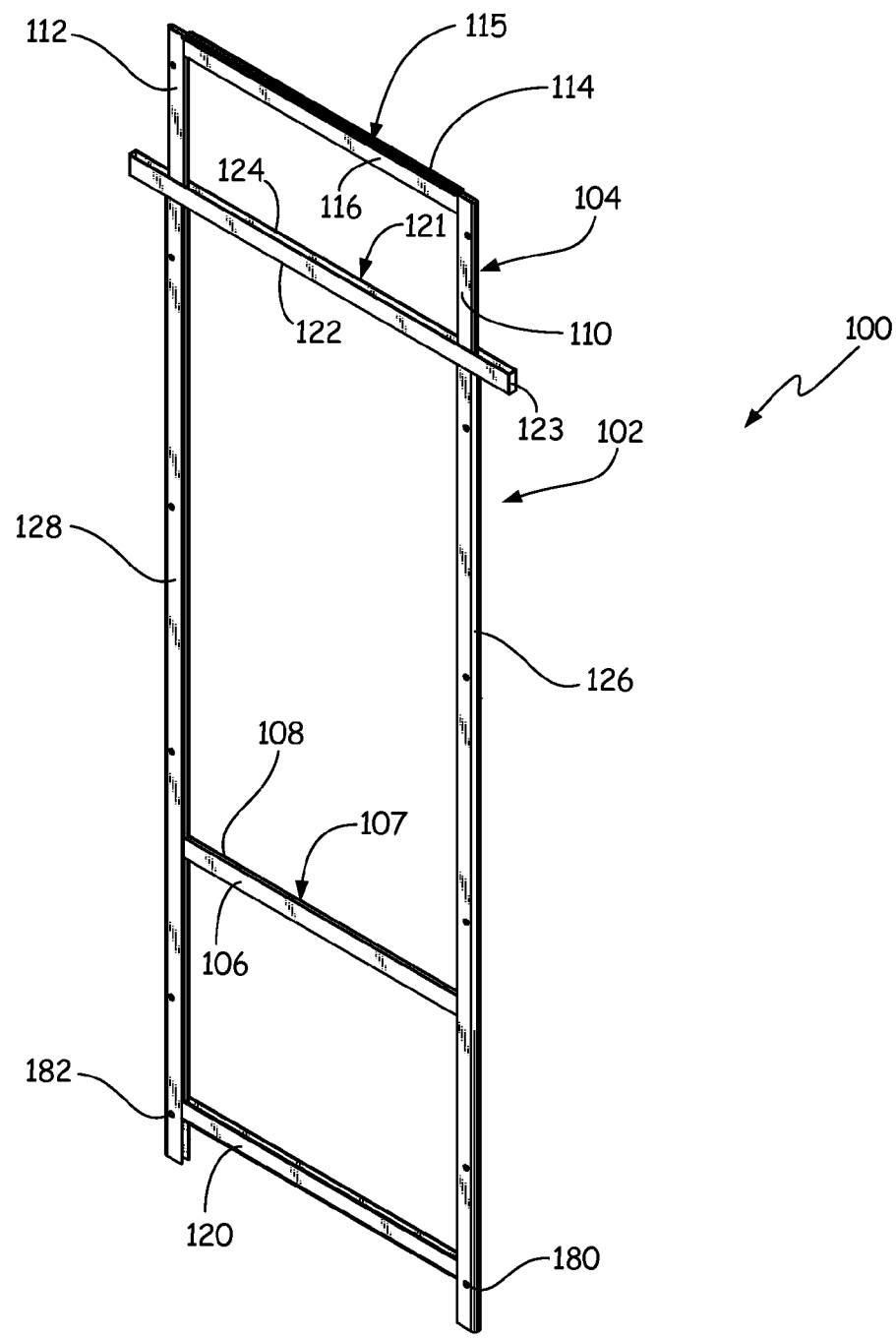
FIG. 1 is a perspective view of an extendable frame assembly.

FIG. 1 provides a perspective view of an extendable frame assembly 100 also referred to as a billboard extender and an extendable billboard support. Extendable frame assembly 100 includes an outer frame 102 also referred to as a base frame or lower frame and an inner frame 104 also referred to as a telescoping frame or an extendable frame. Inner frame 104 includes telescoping lower support members 106 and 108 also referred to as lower crossbars, which are spaced apart from each other by a space 107. Telescoping lower support members 106 and 108 extend between two substantially vertical members 110 and 112 also referred to as movable supports or substantially vertical elements. A telescoping upper support or lateral assembly having first and second lateral members 114 and 116 extends between the tops of substantially vertical members 110 and 112. First and second lateral members 114 and 116 are also referred to as top lateral supports and lateral supports. Lateral members 114 and 116 are separated by a space 115 and as described further below include a substantially vertical portion and a substantially horizontal portion connected by a bend that provides structural rigidity to lateral members 114 and 116.

Figure 9:
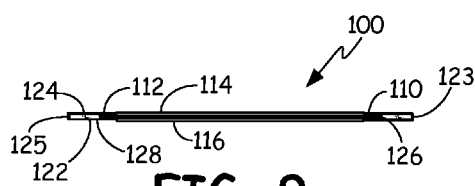
FIG. 9 is a top view of an extendable frame assembly.
Figure 10:
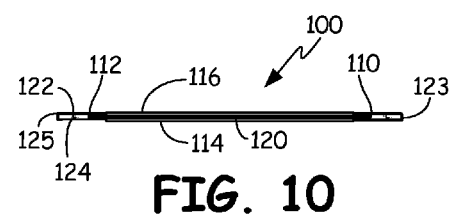
FIG. 10 is a bottom view of an extendable frame assembly.

Movable supports 110 and 112 move within two substantially vertical supports 126 and 128 of outer frame 102. Substantially vertical supports 126 and 128 are alternatively referred to as substantially vertical legs or substantially vertical elements. Outer frame 102 includes a lower crossbar 120 also referred to as a lateral support, which is connected between substantially vertical supports 126 and 128 at a raised position above the bottoms of substantially vertical supports 126 and 128. Outer frame 102 also includes top lateral supports 122 and 124, also referred to as top cross bars and top lateral members. Top lateral supports 122 are separated from each other by a space 121 and are connected to each other by end pieces 123 and 125 (FIG. 9). Top lateral supports extend between substantially vertical legs 126 and 128 and extend laterally outward from substantially vertical legs 126 and 128 to ends 123 and 125 (FIG. 9).

Fixed pins or stops 180 and 182 are positioned in outer frame 102 such that the bottoms of substantially vertical elements 110 and 112 of inner frame 104 are in contact with fixed stops 180 and 182 when extendable frame assembly 100 is in a fully collapsed state.

Figure 2:
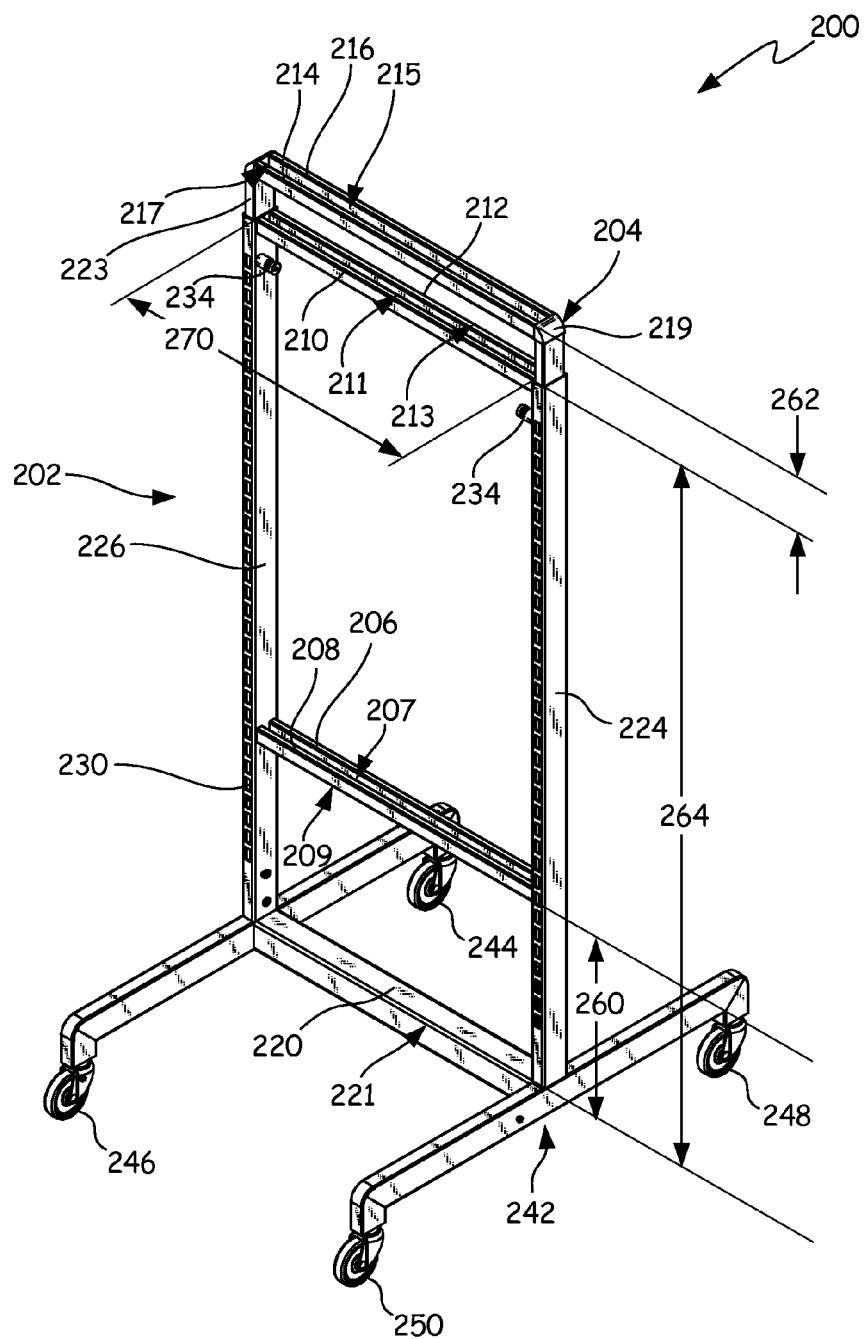
FIG. 2 is a perspective view of a convertible rack fixture.

FIG. 2 provides a perspective view of a convertible rack fixture 200 also referred to as a base fixture. Convertible rack fixture 200 includes a bottom assembly 202 and a telescoping assembly 204 also referred to as an extendable assembly. Bottom assembly 202 includes a platform 242 having a base 220 with a top surface 221 and a set of casters 244, 246, 248 and 250 that allow rack fixture 200 to be moved within a retail environment. Two uprights 224 and 226, which are alternatively referred to as two substantially vertical members, extend upward from base 220. Two bottom crossbars 206 and 208, also referred to as two lower lateral supports, extend between uprights 224 and 226. Lower crossbar 208 has a bottom surface 209 and lower crossbars 206 and 208 are separated by a space 207. Bottom assembly 202 also includes top crossbars 210 and 212 also referred to as top lateral supports, which extend between the tops of uprights 224 and 226. Top crossbar 212 has a top surface 213 and top crossbars 210 and 212 are separated by a space 211.

Extendable assembly 204 includes two lateral bars 214 and 216, also referred to as telescoping crossbars, extending between two telescoping substantially vertical members 223 and 219. Lateral bars 214 and 216 are separated by a space 215 and include a top surface 217.

Uprights 224 and 226 include openings 230 that can accept shelving brackets. Uprights 224 and 226 also include pullout pins 234 that hold extendable assembly 204 in position at different substantially vertical positions above bottom assembly 202. In particular, by pulling pins 234 toward each other, extendable assembly 204 is released and may be moved up or down. Pins 234 can be spring loaded such that when they are released they move back into position and lock extendable assembly 204 into position.

Bottom surface 209 of bottom crossbar 208 is separated from top surface 221 of base 220 by a distance 260. In accordance with one embodiment, distance 260 is substantially 12.75 inches. Top surface 211 of top crossbars 210 and 212 is separated from top surface 221 of base 220 by a distance of 264, which in one embodiment is substantially 50.25 inches. Top surface 217 of telescoping crossbar 214 is separated from top surface 213 of top crossbar 212 by a substantially vertical distance 262, which in accordance with some embodiments is substantially 4 inches. Uprights 224 and 226 are separated by a lateral distance 270, which in accordance with some embodiments is substantially 23 inches.

Figure 3:
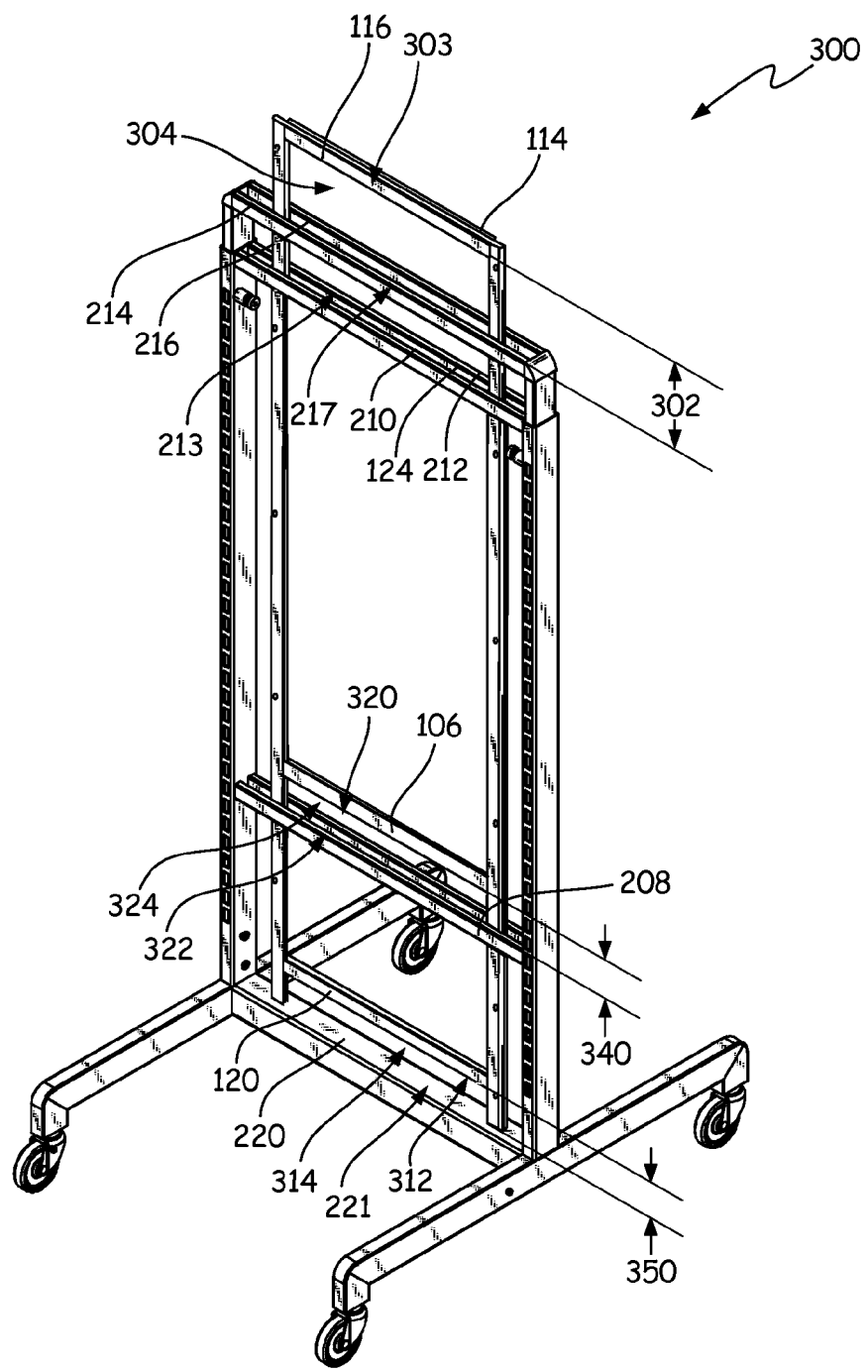
FIG. 3 is a perspective view of an extendable frame assembly within a convertible rack fixture.

FIG. 3 provides a perspective view showing extendable frame assembly 100 inserted within rack fixture 200 to form a display fixture or display unit 300. In FIG. 3, extendable frame assembly 100 is located between bottom crossbars 206 and 208, between top crossbars 210 and 212 and between telescoping crossbars 214 and 216 with the bottoms of substantially vertical legs 126 and 128 resting on top surface 221 of base 220. With both the extendable frame assembly 100 and the rack fixture 200 in their fully collapsed states as depicted in FIG. 3, a bottom surface 303 of lateral members 114 and 116 of extendable frame assembly 100 is separated by a substantially vertical distance 302 from top surface 217 of telescoping crossbars 214 and 216 of base fixture 200. This creates a space 304 between lateral members 114, 116 and telescoping crossbars 214, 216. Substantially vertical distance 302 in accordance with one embodiment is substantially $2^{10}/_{16}$ inches. This distance is sufficient to prevent a person's fingers from being caught between lateral members 114, 116 and telescoping crossbars 214, 216 when inner frame 104 is collapsed towards outer frame 102 while rack fixture 200 is in its fully collapsed state.

In the collapsed state shown in FIG. 3, display fixture 300 provides a space 324 between a top 322 of bottom crossbars 206 and 208 of rack fixture 200 and a bottom surface 320 of telescoping lateral supports 106, 108 of extendable frame assembly 100. In particular, a substantially vertical distance 340 extends between surfaces 320 and 322 where in accordance with some embodiments, the substantially vertical distance is substantially $1^{15}/_{16}$ inches. Distance 340 prevents a person's fingers from being pinched between telescoping lateral supports 106, 108 and bottom crossbars 206, 208 as inner frame 104 is slid down into outer frame 102 while extendable frame assembly 100 is positioned within rack fixture 200.

Lateral support 120 has a bottom surface 312 that is separated from top surface 221 of base 220 by a distance 350 thereby creating a space 314 between lateral support 120 and base 220. In accordance with one embodiment, distance 350 is substantially $2^{1}/_{8}$ inches. Distance 350 prevents a person's fingers from being pinched between lateral support 120 and base 220 when inserting extendable frame assembly 100 within rack fixture 200.

In FIG. 3, top lateral supports 122 and 124 are shown to be aligned with top crossbars 210 and 212 of rack fixture 200. As a result, top lateral supports 122 and 124 are obscured from view by top crossbars 210 and 212.

Figure 4:
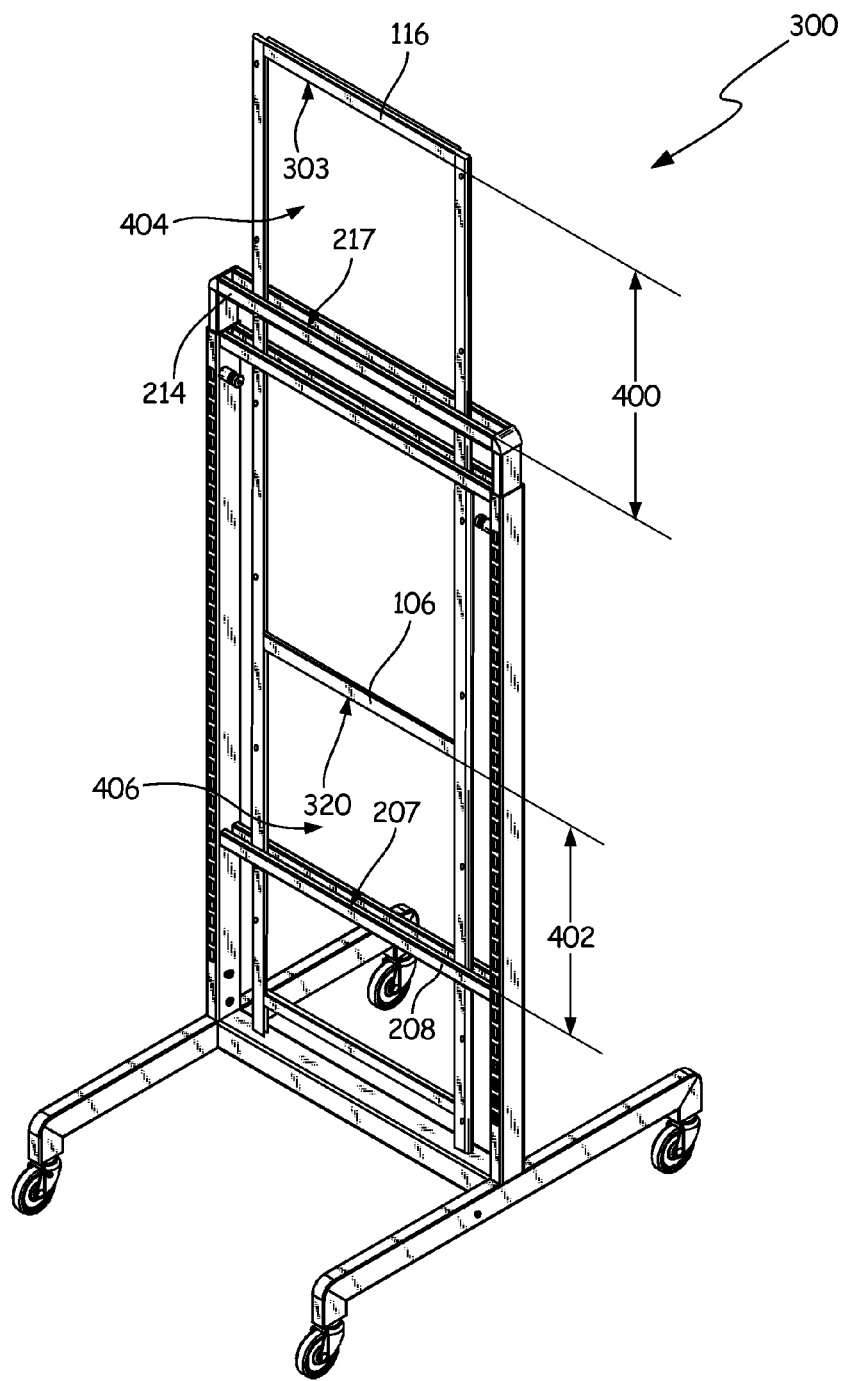
FIG. 4 is a perspective view of an extendable frame assembly extended within a convertible rack fixture.

FIG. 4 provides a perspective view of display fixture 300 with inner frame 104 extended upward from outer frame 102 such that bottom surface 303 of lateral members 114 and 116 is a distance 400 from top surface 217 of telescoping crossbars 210 and 212. In the extended position, distance 400 is greater than distance 302 of FIG. 3. Similarly, bottom surface 320 of telescoping lower support 106 is a substantially vertical distance 402 from top surface 207 of bottom crossbar 208. In FIG. 4, outer frame 102 remains in the same position and rests upon top surface 221 of base 220.

Figure 5:
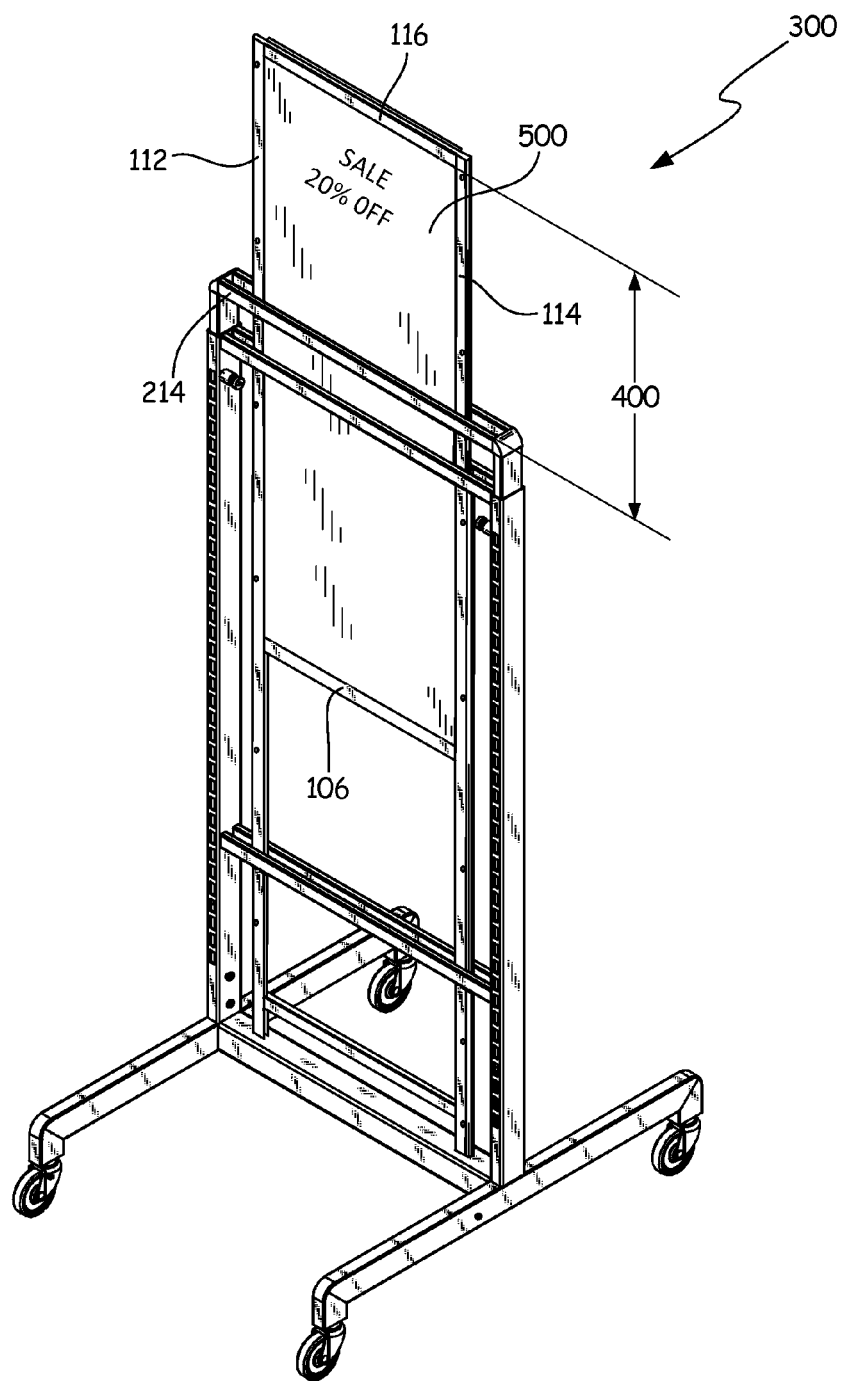
FIG. 5 is a perspective view of an extendable frame assembly with a printed sign positioned within a convertible rack fixture.

FIG. 5 provides a perspective view of display fixture 300 with a printed sign 500 installed in inner frame 104 of extendable frame assembly 100. In FIG. 5, inner frame 104 is extended from outer frame 102 such that lateral member 116 of inner frame 104 is separated from crossbars 214, 216 of rack fixture 200 by distance 400. In FIG. 5, printed board 500 is installed within channels defined in substantially vertical members 112, 114, within space 107 between telescoping lower supports 106 and 108 and within space 115 between lateral members 114 and 116. In alternative embodiments, printed board 500 may be installed on the exterior of extendable frame assembly 100. In such embodiments, two different printed boards may be provided—one for each side of extendable frame assembly 100. The printed boards may be attached to extendable frame assembly 100 using push pins which are inserted into holes in the extendable frame assembly. Such holes are described more fully below.

Figure 6:
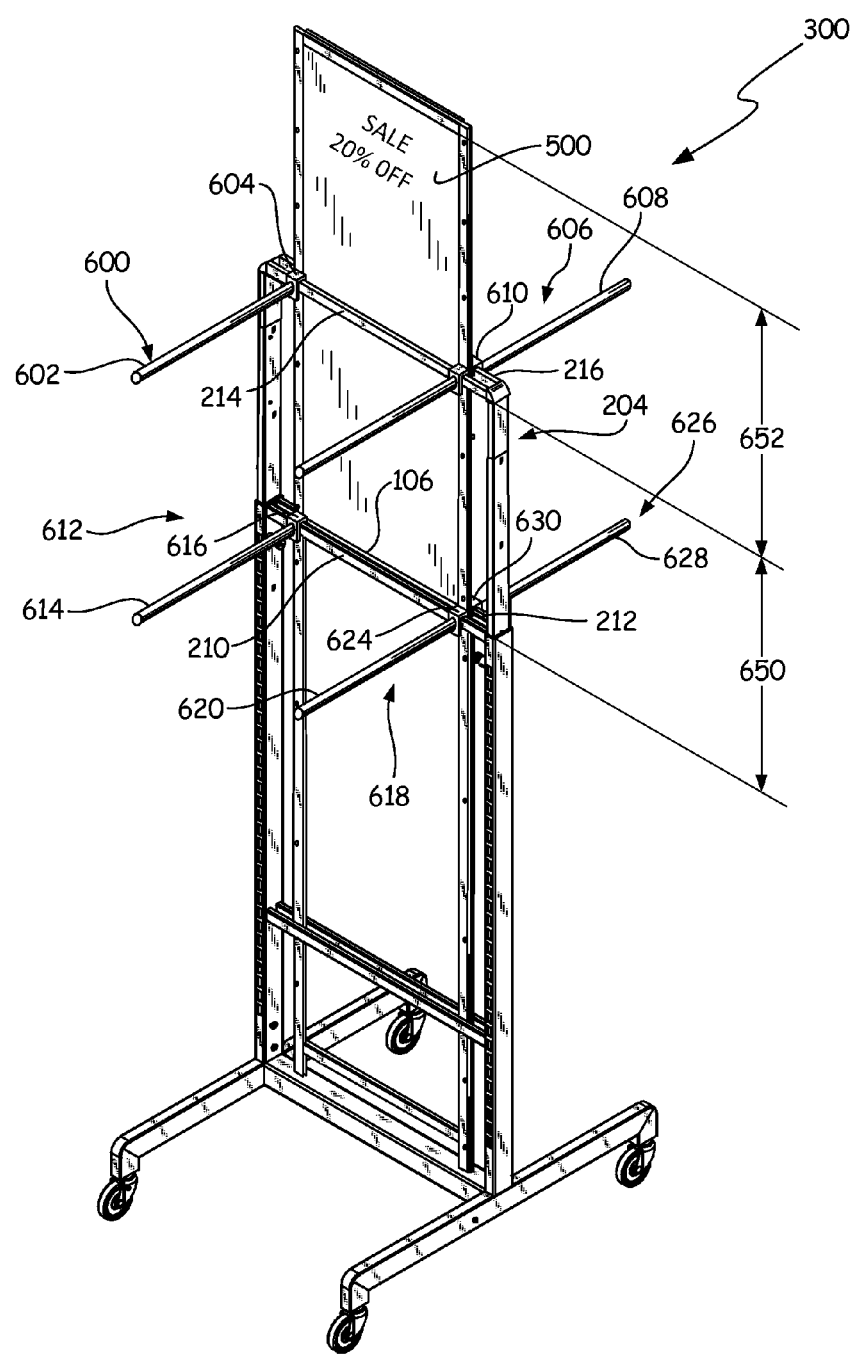
FIG. 6 is a perspective view of an extendable frame assembly within a convertible rack fixture that is also extended.

FIG. 6 provides a perspective view of display fixture 300 with inner frame 102 in a further extended position and telescoping assembly 204 in an extended position. In FIG. 6, top surface 217 of telescoping crossbars 214 and 216 are a distance 650 from top surface 213 of top crossbars 210 and 212. Distance 650 of FIG. 6 is greater than distance 262 of FIG. 2.

In its further extended position, inner frame 104 is positioned such that lateral members 114 and 116 are a distance 652 above telescoping crossbars 214 and 216 of rack fixture 200. In accordance with one embodiment, distance 652 is the same as distance 400 of FIG. 4. However, in order to maintain the same distance, inner frame 104 must be extended further than in FIGS. 4 and 5. This can be seen in FIG. 6 because telescoping lower support 106 of inner frame 104 is now aligned with top crossbars 210 and 212 of base fixture 200.

In FIG. 6, accessories 600, 606, 612, 618 and 626 have been mounted to crossbars 214, 216, 210 and 212. Accessories 600, 606, 612, 618 and 626 are called faceouts and act as supports for hangers. Each faceout includes a mounting bracket such as mounting brackets 604, 610, 616, 624 and 630 that includes a channel such that when the accessory is mounted to a crossbar, the crossbar resides in the channel. Each faceout also includes a bar such as bars 602, 608, 614, 620 and 628. Products may be hung from the bars for example by placing the products on hangers then installing the hangers on the bars.

Figure 7:
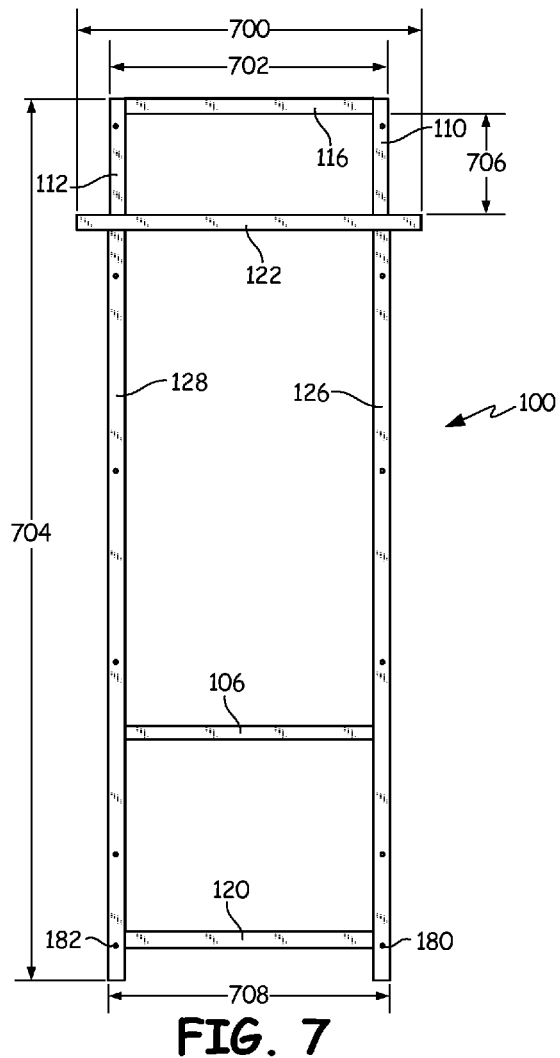
FIG. 7 is a front view of an extendable frame assembly.

FIGS. 7, 8, 9 and 10 provide a front view, a right side view, a top view and a bottom view, respectively, of extendable frame assembly 100. The back view is identical to the front view and the left side view is identical to the right side view. As shown in FIG. 7, inner frame 104 has a width 702 and outer frame 102 has a width 708. In accordance with one embodiment, width 702 is substantially 18$^{9}$/$_{32}$ inches and width 708 is substantially 18½ inches. Top lateral support 122 has a width 700. In accordance with one embodiment, width 700 is substantially 22⅝ inches. The top of lateral member 116 of inner frame 104 is located a distance 704 from the bottom of legs 126 and 128. In accordance with one embodiment, distance 704 is substantially 57$^{15}$/$_{16}$ inches. Lateral member 116 is also a distance 706 from top lateral support 122. In accordance with one embodiment, distance 706 is substantially 6$^{10}$/$_{16}$ inches.

Figure 8:
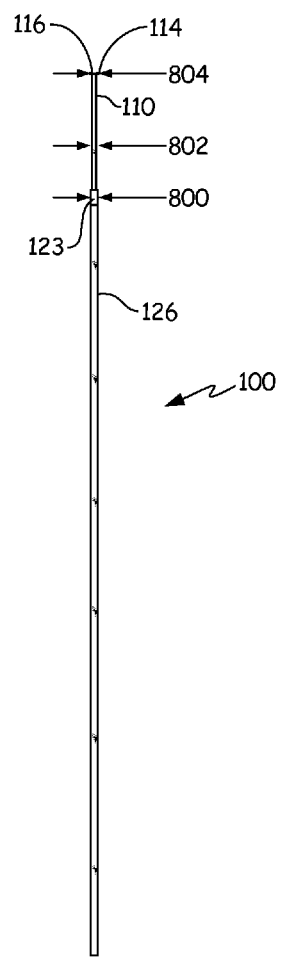
FIG. 8 is a right side view of an extendable frame assembly.

Outer frame 102 has a thickness 800 as shown in FIG. 8. In accordance with one embodiment, thickness 800 is substantially $^{15}$/$_{32}$ of an inch. In accordance with one embodiment, outer frame 102 has a consistent thickness throughout such that substantially vertical legs 126 and 128, lower lateral support 120, and top lateral supports 122,124 each have the same thickness 800.

Substantially vertical members 110 and 112 and substantially vertical portions of lateral members 114 and 116 of inner frame 104 have a thickness 802. In accordance with one embodiment, thickness 802 is substantially $^{9}$/$_{32}$ of an inch. The ends of substantially horizontal portions of lateral members 114 and 116 are separated by a distance 804, which in one embodiment is substantially $^{9}$/$_{16}$ of an inch. Thus, distance 804 is greater than thickness 800 of outer frame 102 and thus prevents inner frame 104 from being inserted upside down into outer frame 102. This assists in proper assembly of extendable frame 100.

Top lateral supports 122 and 124 have closed ends 125 and 123. In accordance with one embodiment, top lateral support 122 and closed end 123 are made of a single piece of material that is bent at the junction between top lateral support 122 and closed end 123. Similarly, top lateral support 124 and closed end 125 are made of a single piece of material that is bent at the junction between top lateral support 124 and closed end 125. Closed end 123 is then welded to lateral support 124 and closed end 125 is welded to lateral support 122.

FIGS. 11, 12 and 13 provide front, right side and top views of outer frame 102. The back view is identical to the front view and the left side view is identical to the right side view. As shown in FIG. 11, there is a distance 350 between a bottom surface 1122 of substantially vertical legs 126, 128 and a bottom surface 312 of lateral support 120. In accordance with one embodiment, distance 350 is substantially 2⅛ inch. Bottom surface 1122 of substantially vertical legs 126, 128 is also separated by a substantially vertical distance 1126 from a top surface 1124 of lateral supports 120 and 122. In accordance with one embodiment, distance 126 is substantially 50¼ inch.

Substantially vertical leg 126 includes through holes 1100, 1104, 1108, 1112 and 1116 and substantially vertical leg 128 includes through holes 1102, 1106, 1110, 1114 and 1118. In both substantially vertical leg 126 and substantially vertical leg 128, the through holes are present in the front and the back of the substantially vertical legs. In accordance with one embodiment, the through holes are located at various heights from the bottom surface 1122 with through holes 1100 and 1102 at a height of substantially 2¼ inches; through holes 1104 and 1106 at a height of substantially 8¼ inches; through holes 1108 and 1110 at a height of substantially 20⅞ inches; through holes 1114 and 1122 at a height of substantially 33$^{7}$/$_{16}$ inches; and through holes 1116 and 1118 at a height substantially 46¼ inches. Through holes 1100 and 1102 receive fixed stops 180 and 182 which can take the form a pin welded into through holes 1100 and 1102.

Figure 14:
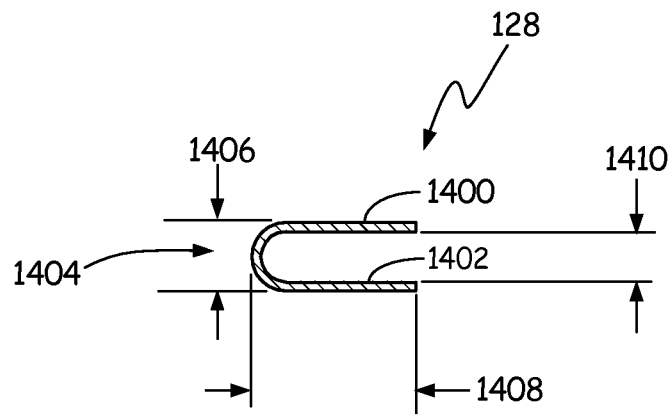
FIG. 14 is a sectional view of an upright of an outer frame.

FIG. 14 shows a sectional view of substantially vertical leg 128 with a section view of substantially vertical leg 126 being a mirror image. FIG. 14 shows that substantially vertical leg 128 is constructed from a single piece of material having a back portion 1400, a front portion 1402 and a rounded side portion 1404 that connects back portion 1400 to front portion 1402. Substantially vertical leg 128 has a thickness 1406 which is substantially equal to thickness 800 shown in FIG. 8. Front portion 1400 is separated from back portion 1402 by a substantially horizontal distance 1410 creating an opening within substantially vertical leg 128 that accepts substantially vertical member 112. In accordance with one embodiment, substantially horizontal distance 1410 is substantially 11/32 inch. Substantially horizontal distance 1410 is the same as the substantially horizontal distance between top lateral support 122 and top lateral support 124.

Figure 15:
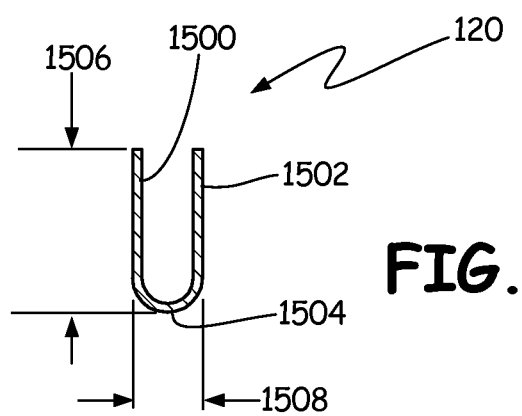
FIG. 15 is a sectional view of a lower crossbar of an outer frame.

FIG. 15 provides a sectional view of lateral support 120. As shown in FIG. 15, lateral support 120 is made of single piece of material that includes a front portion 1500, a back portion 1502 and a rounded portion 1504 that connects front portion 1500 to back portion 1502. Lateral support 120 has a height 1506, which in accordance with one embodiment is substantially 1 3/32 inches, and a thickness 1508, which is substantially equal to thickness 800 of FIG. 8. Thus, lateral support 120 has the same thickness as substantially vertical legs 126, 128.

In accordance with one embodiment, ends of lateral support 120 are welded to side edges of substantially vertical legs 126 and 128. Similarly, the tops of substantially vertical legs 126 and 128 are welded to bottom edges of lateral supports 122 and 124. In accordance with one embodiment, lateral support 120, substantially vertical legs 126 and 128, lateral supports 122 and 124 and closed ends 123 and 125 are all made of 16 gauge steel. In other embodiments, other steel thicknesses are used. In still further embodiments, other rigid materials are used such as other metals or plastics.

FIGS. 16, 17 and 18 provide a front view, a right side view and a top view, respectively, of inner frame 104. The back view is identical to the front view and the left side view is identical to the right side view.

As shown in FIG. 16, inner frame 104 has an outer width 1600, which in accordance with one embodiment is substantially 18 9/32 inches, and a height 1602, which in accordance with one embodiment is substantially 55½ inches. Substantially vertical members 110 and 112 of inner frame 104 are separated by a distance 1604, which in accordance with one embodiment is substantially 16¼ inches. Lateral member 116 is separated from telescoping lower support 106 by a substantially vertical distance 1606, which in accordance with one embodiment is substantially 40¼ inches. Telescoping lower support 106 is separated from bottom 1642 of substantially vertical member 112 by a substantially vertical distance 1608, which in accordance with one embodiment is substantially 13 5/16 inches. Substantially vertical members 110 and 112 have a length that is greater than the length of substantially vertical legs 126 and 128.

Substantially vertical members 110 and 112 include bottom surfaces 1640 and 1642 which in the fully collapsed state rest upon fixed stops 180 and 182, respectively.

Substantially vertical member 110 includes through holes 1610, 1612, 1614, 1616, 1618, 1620 and 1622 and substantially vertical member 112 includes through holes 1624, 1626, 1628, 1630, 1632, 1634 and 1636. Each of the through holes is found on both the front surface and the back surface of substantially vertical members 110 and 112. Each of the through holes is designed to receive a fastener for fastening printed sheets or boards to inner frame 104. In accordance with one embodiment, the through holes are located at various heights from bottoms 1640 and 1642 of substantially vertical members 110 and 112 with through holes 1610 and 1624 at a height of substantially 9 9/16 inches; through holes 1612 and 1626 at a height of substantially 15 9/16 inches; through holes 1614 and 1628 at a height of substantially 28 9/32 inches; through holes 1616 and 1630 at a height of substantially 34 5/8 inches; through holes 1618 and 1632 at a height of substantially 40 31/32 inches; through holes 1620 and 1634 at a height of substantially 47 11/32 inches; and through holes 1622 and 1636 at a height of substantially 53 11/16 inches.

In accordance with one embodiment, substantially vertical members 110 and 112, telescoping lower supports 106 and 108 and lateral members 114 and 116 are each constructed of 18 gauge steel. In other embodiments, other steel thicknesses are used. In still further embodiments, other rigid materials are used such as other metals or plastics.

Figure 19:
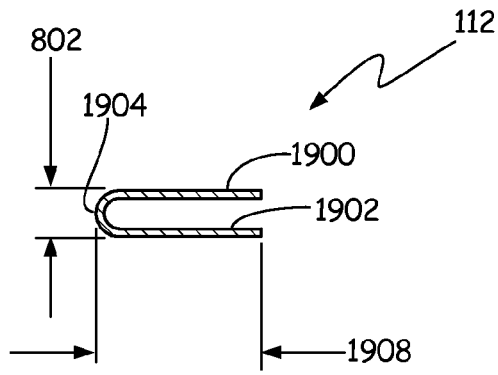
FIG. 19 is a sectional view of substantially vertical leg of an inner frame.

FIG. 19 provides a sectional view of substantially vertical member 112 with substantially vertical member 110 having a mirror image sectional view. As shown in FIG. 19, substantially vertical member 112 is constructed of a single piece of material with a back portion 1900 connected to a front portion 1902 by a rounded portion 1904. Substantially vertical member 112 has an outer thickness 802. In accordance with one embodiment, thickness 802 is 9/32 of an inch and is therefore less than substantially horizontal distance 1410 separating front portion 1400 and back portion 1402 of substantially vertical legs 126, 128. Thus, substantially vertical members 110 and 112 can slide freely within substantially vertical legs 126 and 128. Note that top lateral supports 122 and 124 are also separated by distance 1410 so that substantially vertical members 110 and 112 also move between top lateral supports 122 and 124.

Figure 20:
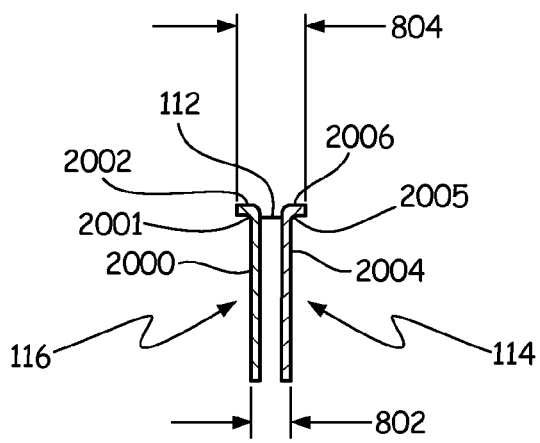
FIG. 20 is a sectional view of a lateral assembly of an inner frame.

FIG. 20 provides a sectional view of lateral members 114 and 116. Lateral member 116 includes a substantially vertical portion 2000 and a substantially horizontal portion 2002 that are joined at a bend 2001. Similarly, lateral member 114 includes a substantially vertical portion 2004 and a substantially horizontal portion 2006 joined together at a bend 2005. Outer surfaces of substantially vertical portions 2000 and 2004 are separated by distance 802. Ends of substantially horizontal portions 2002 and 2006 are separated by distance 804. Substantially horizontal portion 2002 extends away from substantially horizontal portion 2006 at bend 2001. Substantially horizontal portion 2006 extends away from substantially horizontal portion 2002 at bend 2005. In accordance with one embodiment, bottom surfaces of substantially horizontal portions 2002 and 2006 are aligned with top surfaces 1644 and 1646 (FIG. 16) of substantially vertical members 110 and 112. In accordance with one embodiment, lateral members 114 and 116 are separate pieces and the ends of substantially vertical portions 2002 and 2004 are welded to side edges of substantially vertical members 110 and 112. For example, lateral member 116 would be welded to a side edge of front portion 1902 of substantially vertical member 112 and a side edge of a front portion of substantially vertical member 110 while lateral support 114 would be welded to a side edge of back portion 1900 of substantially vertical member 112 and a side edge of a back portion of substantially vertical member 110.

Figure 21:
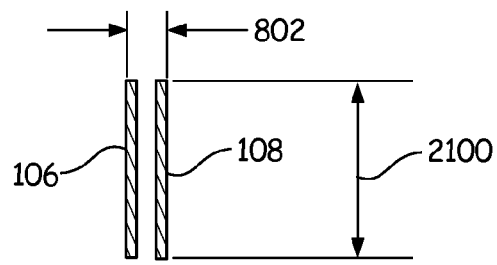
FIG. 21 is a sectional view of a telescoping lower support of an inner frame.

FIG. 21 shows a sectional view of telescoping lower supports 106 and 108. In accordance with one embodiment, telescoping lower supports 106 and 108 are separated from each other and their outer surfaces are separated by distance 802. Telescoping lower supports 106 and 108 have a height 2100, which in accordance with one embodiment is substantially 1 inch. In accordance with one embodiment, telescoping lower supports 106 and 108 are welded to substantially vertical members 112 and 110. For example, an end of telescoping lower support 106 is welded to a side surface of front portion 1902 of substantially vertical member 112 and another end of telescoping lower support 106 is welded to a side surface of a front portion of substantially vertical member 110. Similarly, an end of telescoping lower support 108 is welded to a side surface of back portion 1900 of substantially vertical member 112 and another end of telescoping lower support 108 is welded to a side surface of a back portion of substantially vertical member 110. Other means for fastening or attaching telescoping lower supports 106 and 108 to substantially vertical members 110 and 112 may be used.

Although elements have been shown or described as separate embodiments above, portions of each embodiment may be combined with all or part of other embodiments described above.

Although elements are shown above in solid lines, the invention may be practiced with one or more elements removed. For example, one or more of the holes in extendable frame assembly 100 may be removed, the portions of top lateral supports 122 and 124 that extend past substantially vertical legs 128 and 126 may be removed and/or lateral support 120 may be removed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A display fixture comprising:
    a convertible rack fixture having a base with a top surface, two uprights extending from the top surface of the base, two bottom crossbars extending between the two uprights, and two top crossbars extending between tops of the two uprights; and
    an extendable frame assembly located between the two bottom crossbars and between the two top crossbars and having a base frame and a telescoping frame that telescopes out of the base frame, the base frame having two substantially vertical legs that rest on the top surface of the base of the convertible rack and a lateral support extending between the two substantially vertical legs separate from the top surface of the base such that there is an empty space between the top surface of the base and the lateral support of the base frame and between the two substantially vertical legs of the base frame so that when a user locates the extendable frame assembly between the two bottom crossbars and between the two top crossbars of the convertible rack fixture the empty space prevents the user from pinching their fingers.

2. The display fixture of claim 1 wherein the telescoping frame comprises two substantially vertical members, a telescoping lower support extending between the two substantially vertical members and a telescoping upper support extending between tops of the two substantially vertical members.

3. The display fixture of claim 2 wherein when the telescoping frame is in a lowest position relative to the base frame, there is a substantially vertical space between the telescoping lower support and the two bottom crossbars.

4. The display fixture of claim 1 wherein the base frame further comprises a top lateral support extending between tops of the two substantially vertical legs wherein the top lateral support is aligned with and positioned between the two top crossbars.

5. The display fixture of claim 2 wherein the convertible rack fixture further comprises a telescoping assembly comprising two telescoping substantially vertical members and two telescoping crossbars at a top of the two telescoping substantially vertical members.

6. The display fixture of claim 5 wherein the telescoping frame extends between the two telescoping crossbars such that there is a substantially vertical distance between the telescoping upper support and the telescoping crossbars.

7. The display fixture of claim 2 wherein the telescoping upper support comprises a first lateral member and a second lateral member, wherein the first and second lateral members each have a respective substantially vertical section, a respective substantially horizontal section, and a respective bend between the substantially vertical section and the substantially horizontal section.

8. A billboard extender comprising:
    a lower frame comprising two substantially vertical supports; and
    an extendable frame comprising two movable supports that move within the two substantially vertical supports and a top lateral support extending between tops of the two movable supports, the top lateral support comprising a first lateral member having a substantially vertical portion, a substantially horizontal portion and a bend between the substantially vertical portion and the substantially horizontal portion, and a second lateral member spaced apart from the first lateral member and having a substantially vertical portion, a substantially horizontal portion and a bend between the substantially vertical portion and the substantially horizontal portion so as to prevent the extendable frame from being inserted into the lower frame upside down.

9. The billboard extender of claim 8 wherein the substantially horizontal portion of the first lateral member extends from the bend of the first lateral member in a direction away from the second lateral member and the substantially horizontal portion of the second lateral member extends from the bend of the second lateral member in a direction away from the first lateral member.

10. The billboard extender of claim 9 wherein the lower frame further comprises a first top crossbar and a second top crossbar that are spaced apart from each other such that the substantially vertical portions of the first lateral member and the second lateral member can fit between the first top crossbar and the second top crossbar but the substantially horizontal portions of the first lateral member and the second lateral member cannot fit between the first top crossbar and the second top crossbar.

11. The billboard extender of claim 10 wherein the first top crossbar and the second top crossbar are at ends of the two substantially vertical supports.

12. The billboard extender of claim 10 wherein the lower frame further comprises a lower crossbar extending between the two substantially vertical supports at a position spaced apart from ends of the two substantially vertical supports opposite the first top crossbar and the second top crossbar.

13. The billboard extender of claim 10 wherein the two movable supports are longer than the two substantially vertical supports.

14. A display unit comprising:
    a base fixture having a platform, two substantially vertical members extending upward from the platform, two top lateral supports extending between the two substantially vertical members at a top of the two substantially vertical members, and two lower lateral supports extending between the two substantially vertical members between the platform and the two top lateral supports; and
    an extendable billboard support located between the two lower lateral supports and between the two top lateral supports and having an outer frame and an inner frame, the outer frame having two substantially vertical elements and two fixed stops positioned in the two substantially vertical elements and the inner frame having two substantially vertical elements that slide within the two substantially vertical elements of the outer frame such that when bottoms of the substantially vertical elements of the inner frame are in contact with the fixed stops, a lower crossbar between the substantially vertical elements of the inner frame is located above the two lower lateral supports and below the two top lateral supports.

15. The display unit of claim 14 wherein the inner frame has a lateral assembly between tops of the substantially vertical elements of the inner frame, the lateral assembly comprising a lateral support having a substantially vertical portion, a substantially horizontal portion and a bend between the substantially vertical portion and the substantially horizontal portion.

16. The display unit of claim 15 wherein the lateral assembly comprises two lateral supports each having a substantially vertical portion, a substantially horizontal portion and a bend between the respective substantially horizontal portion and the respective substantially vertical portion, wherein the substantially horizontal portions extend away from each other at the respective bends.

17. The display unit of claim 16 wherein the outer frame has two top lateral members separated by a substantially horizontal distance and wherein a distance between ends of the substantially horizontal portions of the two lateral supports is longer than the substantially horizontal distance between the two top lateral members.

18. The display unit of claim 16 wherein each substantially horizontal portion has a bottom surface that is aligned with the tops of the substantially vertical elements of the inner frame.

19. The display unit of claim 14 wherein the outer frame comprises a lower crossbar between the two substantially vertical elements of the outer frame and spaced apart from the platform.

20. The display unit of claim 15 wherein the base fixture further comprises an extendable assembly having two lateral bars such that the lateral assembly of the inner frame is above the two lateral bars when the bottoms of the substantially vertical elements of the inner frame contact the fixed stops.

* * * * *